United States Patent

Vertogen et al.

[11] Patent Number: 5,944,171
[45] Date of Patent: Aug. 31, 1999

[54] CONVEYOR AND SUPPORT ROLLERS AROUND CURVED TRAVELING PORTION

[75] Inventors: Martinus Johannes Maria Vertogen, Zeeland; Jakobus Marie Van Den Goor, Nuenen, both of Netherlands

[73] Assignee: Vanderlande Industries Nederland B.V., Veghel, Netherlands

[21] Appl. No.: 08/985,283

[22] Filed: Dec. 4, 1997

[30] Foreign Application Priority Data

Dec. 5, 1996 [NL] Netherlands .......................... 1004699

[51] Int. Cl.[6] .................................................. B65G 15/60
[52] U.S. Cl. .......................................................... 198/837
[58] Field of Search .................................. 198/838, 837, 198/831, 806, 840, 841

[56] References Cited

U.S. PATENT DOCUMENTS

| 5,427,223 | 6/1995 | Van Den Goor . |
| 5,435,429 | 7/1995 | Van Den Goor . |
| 5,590,995 | 1/1997 | Berkers et al. . |
| 5,657,858 | 8/1997 | Van Den Goor . |
| 5,667,054 | 9/1997 | Van Den Goor . |
| 5,695,042 | 12/1997 | Van Der Burgt et al. . |

FOREIGN PATENT DOCUMENTS

| 0 716 034 | 6/1996 | European Pat. Off. . | |
| 151564 | 10/1981 | Germany ............................... | 198/837 |
| 405024622 | 2/1993 | Japan ..................................... | 198/837 |

OTHER PUBLICATIONS

Patent Abstracts of Japan, vol. 96, No. 9, Sep. 30, 1996, JP 08–133438, May 28, 1996.
Patent Abstracts of Japan, vol. 96, No. 4, Apr. 30, 1996, JP 07–323–908, Dec. 12, 1995.

*Primary Examiner*—William E. Terrell
*Assistant Examiner*—Khoi H. Tran
*Attorney, Agent, or Firm*—Oblon, Spivak, McClelland, Maier & Neustadt, P.C.

[57] ABSTRACT

The invention relates to a conveyor comprising a frame and an endless conveyor belt describing a bend, said conveyor belt near its ends being passed over reversing rollers which are journalled in the frame and which are rotatable about axes of rotation. On the outer side of the bend the endless conveyor belt is provided with a projecting collar, with which guide rollers make contact. A guide roller present under said belt and a guide roller present above said belt are connected to a supporting member, which freely rotatably supports a supporting roller for the conveyor belt. Spring means are provided, which act on the supporting member, in such a manner that the guide rollers connected to the supporting member transfer a force directed away from the inner side of the bend to the belt. The two guide rollers are supported by a common support, which is capable of pivoting movement with respect to said supporting member about a pivot pin which intersects the axis of rotation of the supporting roller at least substantially perpendicularly.

8 Claims, 5 Drawing Sheets

CONVEYOR AND SUPPORT ROLLERS AROUND CURVED TRAVELING PORTION

The invention relates to a conveyor comprising a frame and an endless conveyor belt describing a bend, said conveyor belt near its ends being passed over reversing rollers which are journalled in the frame and which are rotatable about axes of rotation including an angle with each other, whilst the endless conveyor belt is provided with a projecting collar on the outer side of the bend, with which guide rollers make contact, whilst a guide roller present under said belt and a guide roller present above said belt are connected to a supporting member, which freely rotatably supports a supporting roller for the conveyor belt, whereby said supporting roller is positioned between the upper part of the conveyor belt and the lower part thereof, and whereby spring means are provided, which act on said supporting member, in such a manner that the guide rollers connected to the supporting member transfer a force directed away from the inner side of the bend to the belt.

A conveyor of this kind is for example known from European patent application No. 0 716 034. Said known conveyor is satisfactory per se, but in some cases there exists a need for a simpler and more compact construction of the supporting member and the rollers supported by said supporting member.

According to the invention this can be realised in that the two guide rollers are supported by a common support, which is capable of pivoting movement with respect to said supporting member about a pivot pin which intersects the axis of rotation of the supporting roller at least substantially perpendicularly.

In this manner a simple and compact construction can be obtained, whilst it has become apparent in practice that the guide rollers can still continue to co-operate in an effective manner with the collar formed on the edge of the conveyor belt.

Preferably the pivot pin of the support is thereby positioned within the outer circumference of the part of the supporting roller that supports the conveyor belt, which ensures that a compact construction is obtained and also that a proper arrangement of the guide rollers with respect to the collar provided on the conveyor belt is maintained when the support pivots about the pivot pin.

In order to make it possible to fit the conveyor belt in a simple manner, the guide rollers are mounted on supporting arms, which are detachably connected to the support, so that the guide rollers will not be in the way when the conveyor belt is to be fitted or removed.

The invention will be explained in more detail hereafter with reference to an embodiment of the construction according to the invention which is diagrammatically illustrated in the Figures.

Figure 1:
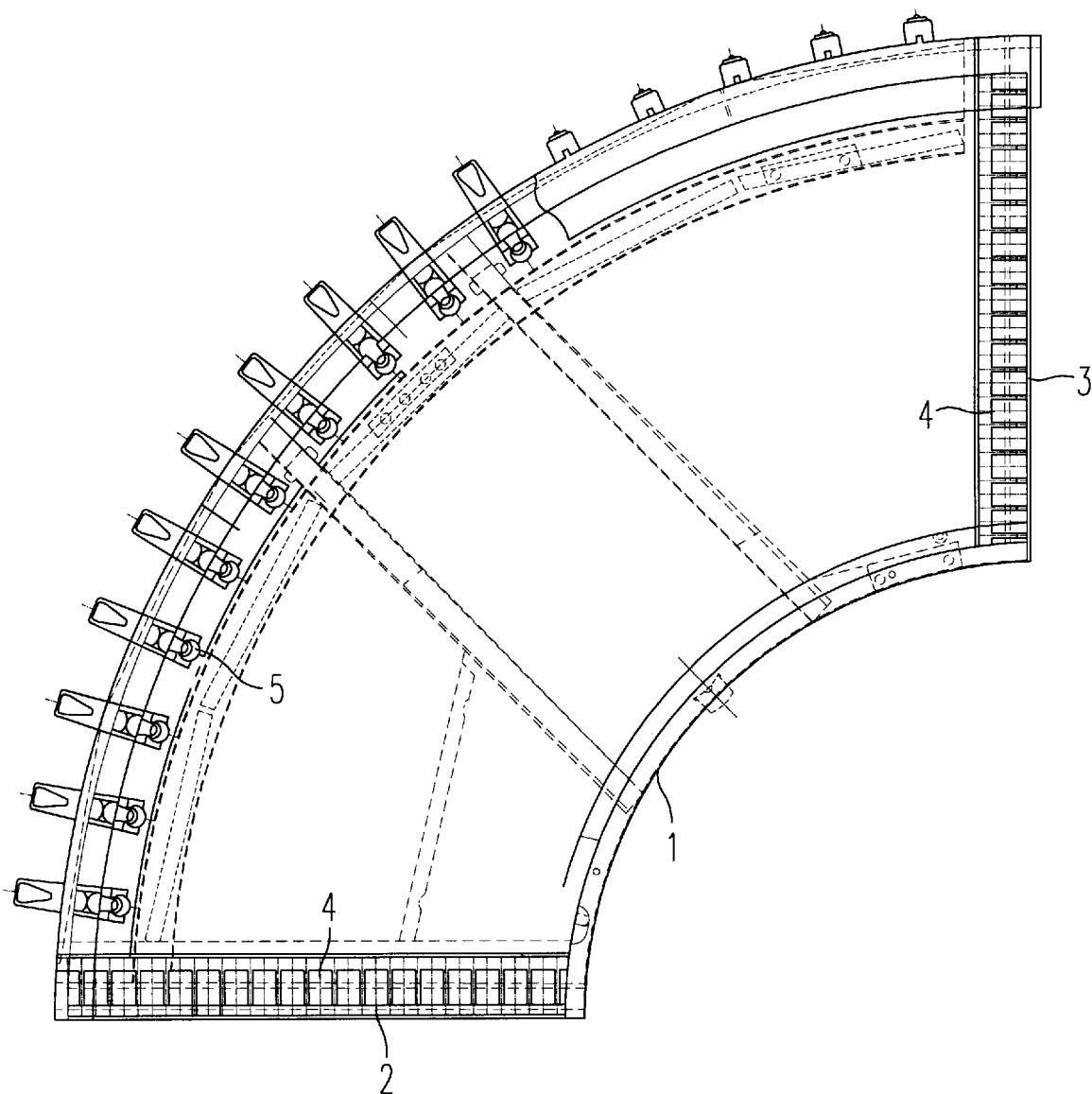
FIG. 1 is a diagrammatic plan view of a part of the frame of the conveyor, showing several rollers supported by the frame.

As is diagrammatically shown in FIG. 1, the conveyor comprises a frame 1, which accommodates two reversing rollers 2 and 3 for an endless conveyor belt. As will be apparent from FIG. 1, said reversing rollers 2 and 3 for the endless conveyor belt are built up of a plurality of freely rotatable discs 4 arranged in side-by-side relationship, whilst the axes of rotation of said reversing rollers 2 and 3 intersect at an angle of at least substantially 90°.

As will furthermore be apparent from FIG. 1, a large number of guide rollers or guide wheels 5 are provided near the outside of the bend described by the endless conveyor belt. As will be apparent from FIGS. 2–6, said guide rollers are arranged in pairs of respectively two guide rollers 5 positioned one above the other. Furthermore a supporting roller 6 is disposed between each pair of guide wheels 5 positioned one above the other.

As will be apparent, inter alia from the aforesaid European patent application No. 0 716 034, whose contents are considered to be incorporated herein by this reference, the two guide rollers 5 positioned one above the other make contact with a projecting collar provided on the side of the endless conveyor belt remote from supporting rollers 6, in such a manner that the upper guide roller contacts the collar on the upper part of the endless conveyor belt, and the lower guide roller 5 contacts the collar present on the lower part of the conveyor belt, whilst supporting roller 6 is positioned between said two parts. Since all this is clearly explained in the aforesaid European patent application 0 716 034, it is assumed that this arrangement need not be explained in more detail herein.

Figure 3:
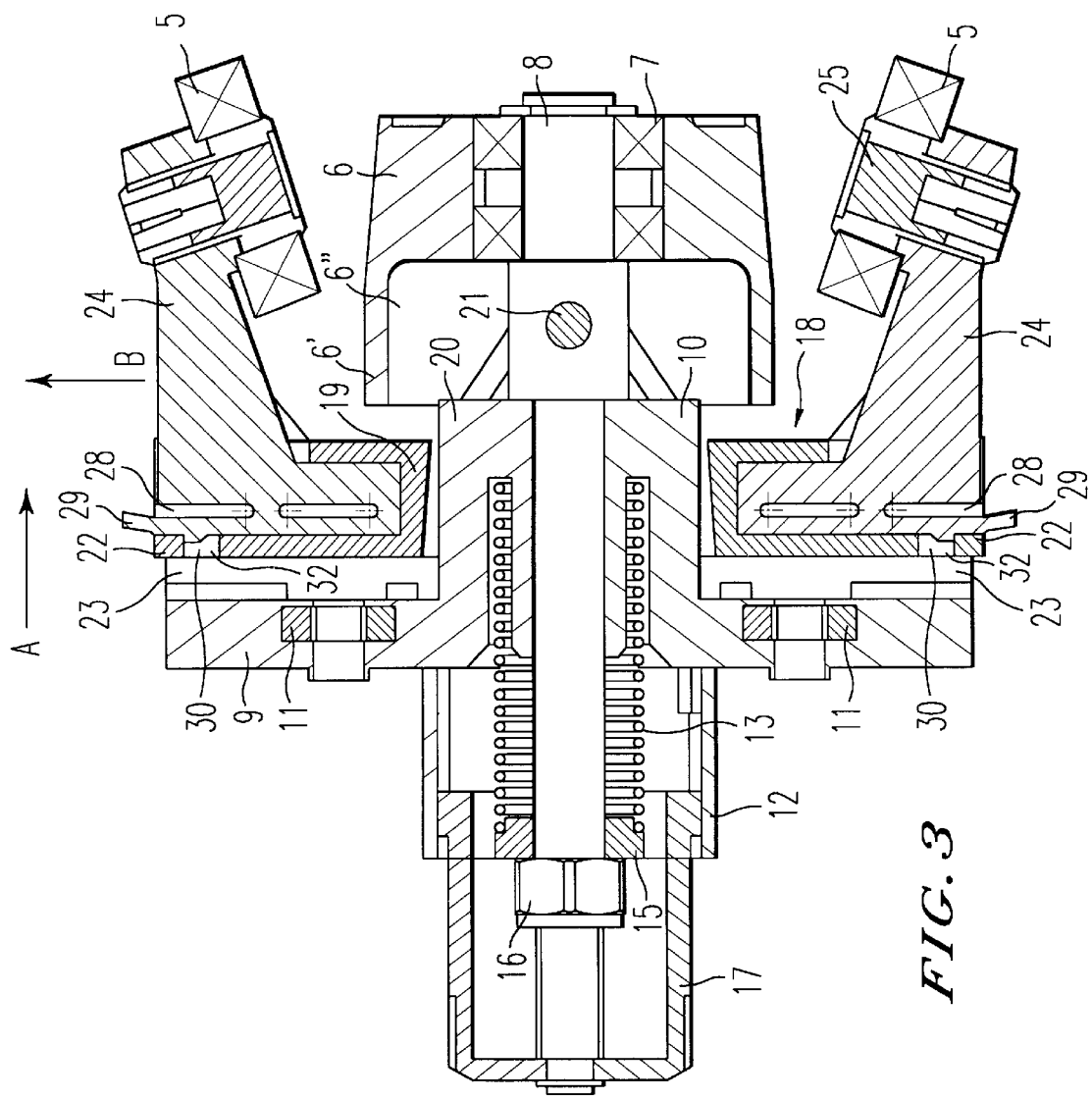
FIG. 3 is a sectional view of FIG. 2, along line III—III in FIG. 2.
Figure 5:
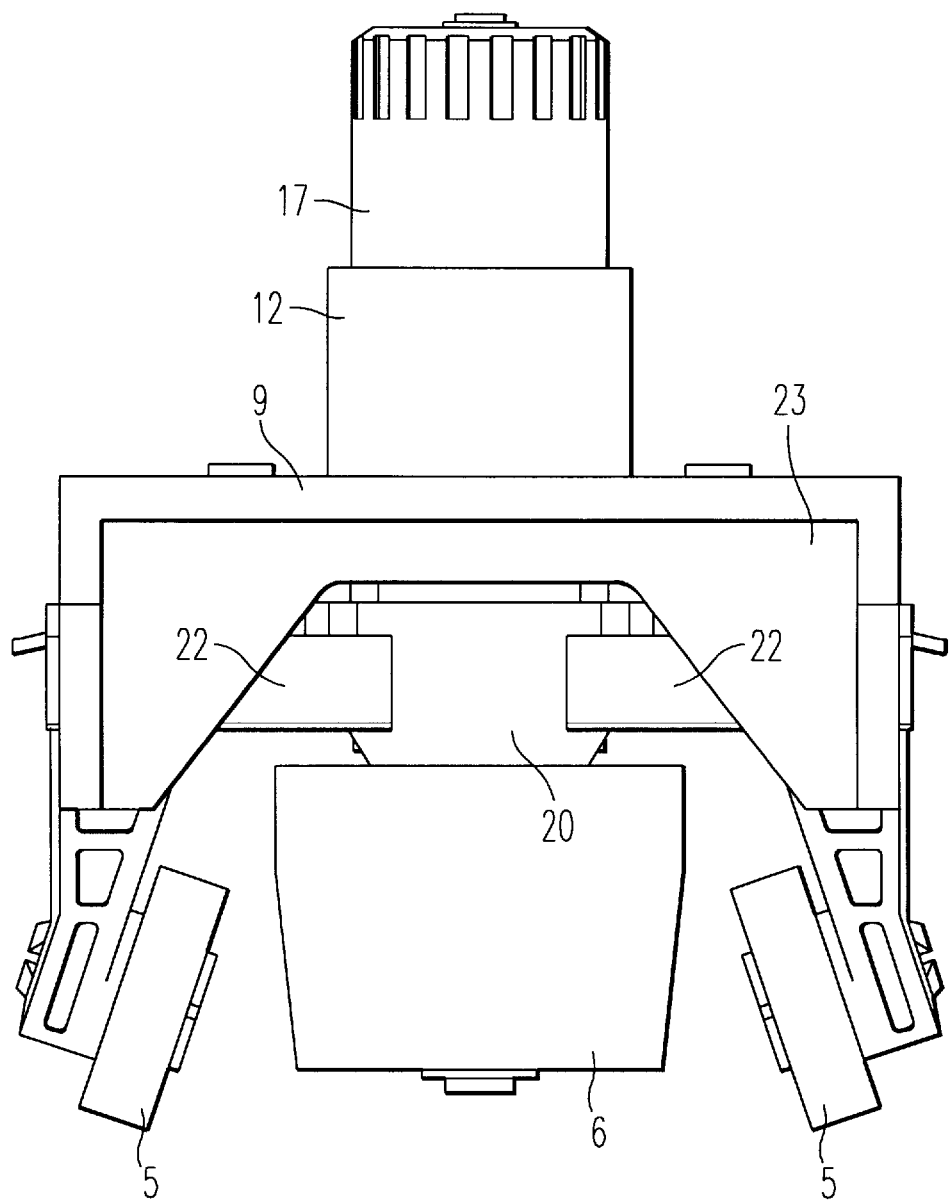
FIG. 5 is a side view of FIG. 2.

As is apparent in particular from FIG. 3, supporting roller 6 is mounted by means of bearings 7 on a shaft 8 forming a supporting member. Such a shaft extends in radial direction with respect to the intersection between the extensions of the axes or rotation of reversing rollers 2 and 3, seen in FIG. 1.

Shaft 8 is slidable in its longitudinal direction in a hub 10, which is integral with a flange 9. Nuts 11 are embedded in flange 9. Said nuts 11, together with bolts (not shown) function to secure flange 9 to frame 1.

A bush 12 being integral with flange 9 is mounted on the side of flange 9 remote from hub 10.

The part of shaft 8 located within bush 12 is surrounded by a compression spring 13. Said compression spring 13 is located over part of its length in an annular recess 14 formed in said hub, and abuts against the bottom of said recess 14 with one end. The other end of compression spring 13 abuts against a ring 15 slid over shaft 8, which ring, on its side remote from compression spring 13, abuts against a nut 16 which is screwed on the threaded end of shaft 8.

A cover 17 having a U-shaped section is attached to the end of shaft 8 remote from supporting roller 6, in the manner shown in FIG. 3, whereby one end of cover 17 is located in the interior of bush 12.

It will be apparent that compression spring 13 attempts to move shaft 8 and the supporting roller 6 secured thereto to the left, seen in FIG. 3, which movement is limited in the position shown in FIG. 3 by a by an embossed part of shaft 8, which functions as a stop member and which abuts against the end of hub 10 facing towards supporting roller 6.

As furthermore appears from FIG. 3, the circumferential surface of supporting roller 6 is slightly conical near bearings 7, whereby the diameter of said part gradually decreases in a direction away from hub 10. The remaining part 6' of the guide roller is made up of a shell, whose outside surface, which co-operates with the conveyor belt, is at least substantially cylindrical. The cylindrical shell thereby bounds a chamber 6", which is recessed in the supporting roller 6.

The construction furthermore comprises a support 18, which is provided with an annular portion 19, which surrounds hub 9 with some play. Attached to said annular portion are two wings 20 positioned on either side of shaft 8, whose ends remote from annular portion 19 project into the recess or chamber 6" formed in supporting roller 6. Said ends of the wings 20 projecting into chamber 6" are thereby coupled to shaft 8 by a pin 21 forming a pivot, whose central axis intersects the central axis of shaft 8 perpendicularly.

Figure 4:
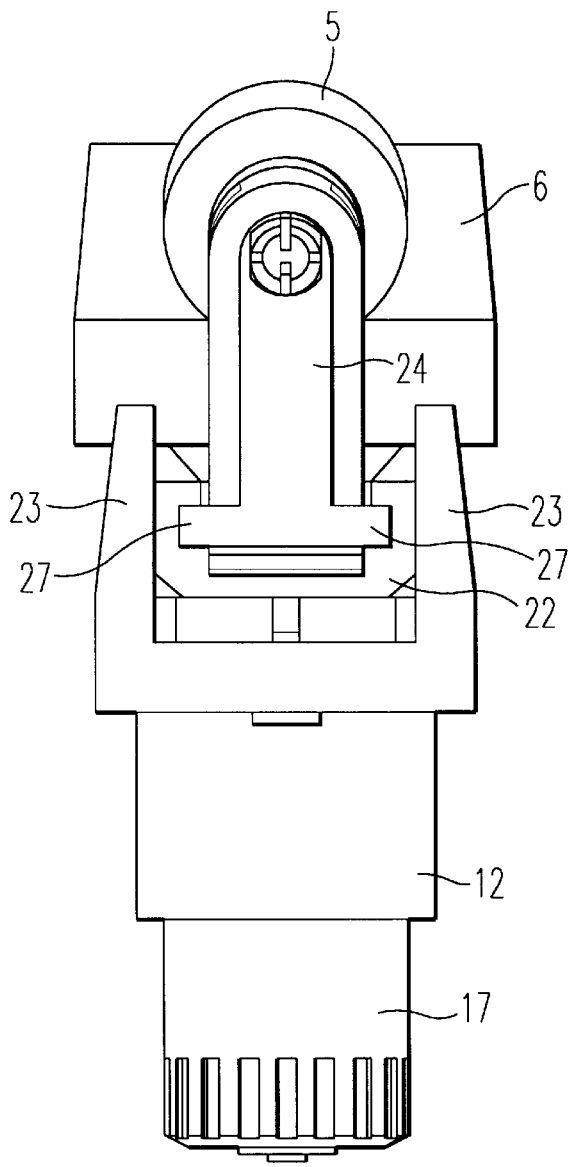
FIG. 4 is a plan view of FIG. 2.
Figure 2:
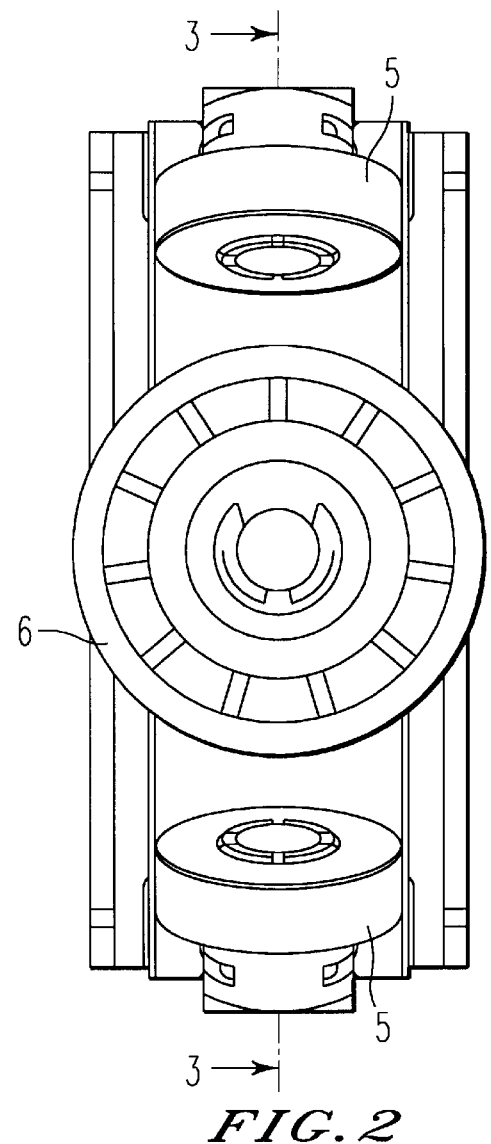
FIG. 2 is a front view of a pair of guide rollers supported by a common support and a supporting roller disposed therebetween.
Figure 6:
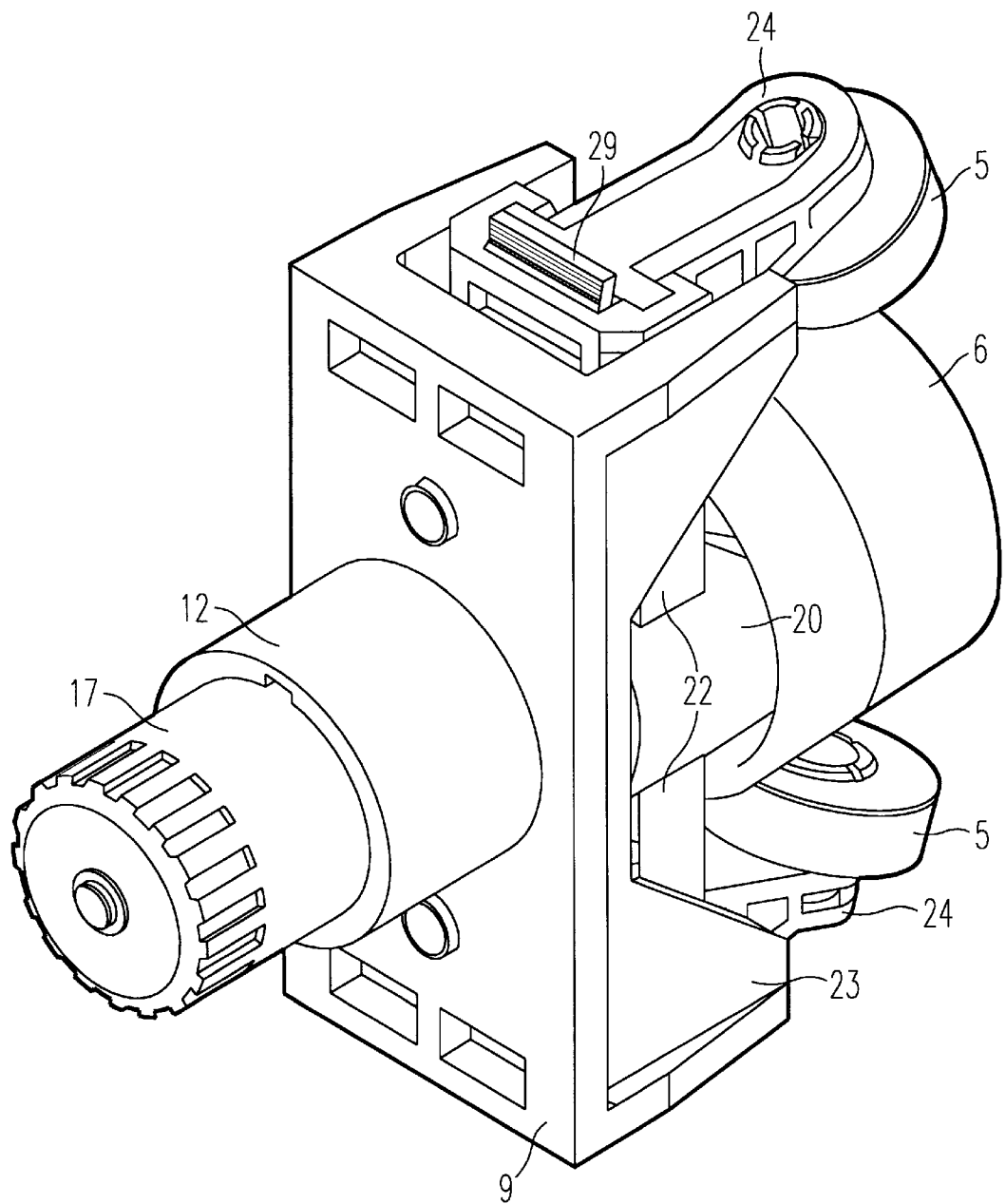
FIG. 6 is a perspective view of the assembly shown in FIG. 5.

Furthermore two tubular sections 22 having a substantially rectangular section and being integral with annular portion 19 are mounted on annular portion 19 in diametrically opposed relationship, which sections are slidably retained between wings 23 being integral with flange 9 and extending perpendicularly to the plane of flange 9 and parallel to each other, as will be apparent in particular from FIGS. 4 and 6. As a result of this manner of guiding the tubular sections 22 being capable of pivoting movement about pivot pin 21 together with annular member 19, forces acting on the sections 22 in a direction perpendicularly to the plane of drawing, seen in FIG. 3, are transferred to wings 23 in an effective manner, whilst sections 22 are still capable of free rotating movement about pivot pin 21.

Each of the tubular sections 22 accommodates a leg of a more or less L-shaped supporting arm 24. A guide roller 5 is mounted on the free end of each supporting arm 24 by means of a pin 25, in such a manner as to be freely rotatable. The extension of the axis of rotation of such a roller 5 intersects the central axis of shaft 8 at an acute angle, as will be apparent from FIG. 3.

As is furthermore apparent from FIG. 4, projecting edges 27 of a leg of a L-shaped arm 24 accommodated in a tubular section 22 are accommodated in correspondingly shaped grooves in the respective tubular section 22.

Furthermore a slot 28, which is open on one side, is provided in arm 24 near the location where the two legs of the L-shaped arm 24 join, thus forming a projecting lip 29 integral with arm 24. The free end of the lip 29 projects beyond the tubular section 22 in the position of support 24 in the tubular section that is shown in FIG. 3. Lip 29 is in one piece with a cam 30, which, in the assembled condition shown in FIG. 3, is positioned in a recess 32 formed in the tubular section 22 in question.

The construction is thereby such that lip 29 can be pivoted in a direction indicated by arrow A by exerting a suitable force on the free end of lip 29 projecting beyond tubular section 22, so as to disengage cam 30 from recess 32, after which the respective L-shaped arm 24 can be withdrawn from the respective tubular section 22 in the direction indicated by arrow B. The supporting arm 24 supporting a guide roller 5 can be mounted again by inserting the leg in question into the tubular section, whereby cam 30 will automatically slip into recess 32 so as to secure supporting arm 24 to support 18. It will be apparent, that in this manner the arms 24 supporting guide rollers 5 can be easily removed and mounted, which is important, for example when mounting and removing the endless conveyor belt, whereby reversing rollers 2' and 3 and supporting rollers 6 must be readily accessible.

As is explained inter alia in the aforesaid European patent application No. 0 716 034, guide rollers 5 will abut against one side of a collar present on the conveyor belt during operation of the conveyor, whilst the upper and lower parts of the conveyor belt will be supported by supporting rollers 6. The arrangement will thereby be such that the embossed part of shaft 8, which forms a stop member, will be located some distance away from the end of hub 10 facing towards supporting roller 6. As a result of this spring 13 will exert a leftward force, seen in FIG. 3, on the assembly of a supporting roller 6 and a group of two guide rollers 5 disposed on either side thereof, which force is directed away from the intersection of the axes of rotation of reversing rollers 2 and 3, seen in FIG. 1, as a result of which a desired movement of the conveyor belt can be maintained. Guide rollers 5 will thereby remain in contact with the collar present on conveyor belt in an effective manner, because said guide rollers are capable of adjusting themselves by pivoting about pivot pin 21.

As will be apparent from the above, the above-described conveyor is built up of a relatively small number of parts, whereby a compact construction has been obtained, among other things by mounting pivot pin in the interior of supporting roller 6 and by accommodating part of spring 13 in a recess formed in the hub 10 supporting shaft 8. Furthermore, as already explained above, guide rollers 5 can be easily removed and be mounted again, which is a very advantageous when carrying out installation and maintenance work and the like.

We claim:

1. A conveyor comprising a frame and an endless conveyor belt describing a bend, said conveyor belt near its ends being passed over reversing rollers which are journalled in the frame and which are rotatable about axes of rotation including an angle with each other, whilst the endless conveyor belt is provided with a projecting collar on the outer side of the bend, with which guide rollers make contact, whilst a guide roller present under said belt and a guide roller present above said belt are connected to a supporting member, which freely rotatably supports a supporting roller for the conveyor belt, whereby said supporting roller is positioned between the upper part of the conveyor belt and the lower part thereof, and whereby spring means are provided, which act on said supporting member, in such a manner that the guide rollers connected to the supporting member transfer a force directed away from the inner side of the bend to the belt, characterized in that the two guide rollers are supported by a common support, which is capable of pivoting movement with respect to said supporting member about a pivot pin which intersects the axis of rotation of the supporting roller at least substantially perpendicularly.

2. A conveyor according to claim 1, characterized in that the pivot pin of the support is positioned within the outer circumference of the part of the supporting roller that supports the conveyor belt.

3. A conveyor according to claim 1, characterized in that said pivot pin couples said support to a shaft which is slidably supported in its longitudinal direction by the frame, on one end of which shaft a supporting roller is mounted.

4. A conveyor according to claim 1, characterized in that said guide rollers are mounted on supporting arms, which are detachably connected to said support.

5. A conveyor according to claim 1, characterized in that said supporting roller is attached to a shaft which is accommodated in a hub secured to the frame, whilst a compression spring surrounding said shaft is provided, with part of said spring being accommodated in an annular recess formed in said hub, whereby the spring is supported on the bottom of the recess with one end and makes contact with said shaft with its other end, and whereby the spring exerts a force on said supporting roller via said shaft in order to move said supporting roller in the direction of said hub.

6. A conveyor according to claim 2, characterized in that a shaft supporting said supporting roller is surrounded by an annular member, which is provided with two wings extending to within a recess formed in said supporting roller, which wings are pivotally connected to said shaft by means of a pivot pin.

7. A conveyor according to claim 4, characterized in that said support comprises two diametrically opposed tubular sections, which accommodate legs of more or less L-shaped supporting arms supporting said supporting rollers.

8. A conveyor according to claim 7, characterized in that a supporting arm comprises a lip which is capable of resilient pivoting movement with respect to the other part of the supporting arm, which lip is provided with a cam, which engages in a recess in a tubular section in the mounted position of the supporting arm.

* * * * *